US012540472B2

(12) United States Patent
Spiro

(10) Patent No.: US 12,540,472 B2
(45) Date of Patent: Feb. 3, 2026

(54) MONO-POINT ROTATIONAL CEILING COUPLED DEVICE CONNECTOR THAT CONVEYS ELECTRICAL POWER

(71) Applicant: Exposure Illumination Architects, Inc., Scottsdale, AZ (US)

(72) Inventor: Daniel S. Spiro, Scottsdale, AZ (US)

(73) Assignee: EXPOSURE IP LLC, Scottsdale, AZ (US)

( * ) Notice: Subject to any disclaimer, the term of this patent is extended or adjusted under 35 U.S.C. 154(b) by 142 days.

(21) Appl. No.: 18/433,140

(22) Filed: Feb. 5, 2024

(65) Prior Publication Data

US 2025/0129604 A1  Apr. 24, 2025

Related U.S. Application Data

(63) Continuation-in-part of application No. 18/381,231, filed on Oct. 18, 2023, now Pat. No. 11,901,718, and a continuation-in-part of application No. 18/406,136, filed on Jan. 6, 2024, now Pat. No. 12,470,052.

(51) Int. Cl.
| | |
|---|---|
| *H02G 3/08* | (2006.01) |
| *E04B 9/00* | (2006.01) |
| *F21V 21/03* | (2006.01) |
| *H02G 3/00* | (2006.01) |
| *H02G 3/20* | (2006.01) |
| *H02G 3/30* | (2006.01) |

(52) U.S. Cl.
CPC .............. *E04B 9/006* (2013.01); *E04B 9/003* (2013.01)

(58) Field of Classification Search
CPC ................................ E04B 9/006; F21V 21/03
See application file for complete search history.

(56) References Cited

U.S. PATENT DOCUMENTS

| | | | |
|---|---|---|---|
| 1,883,621 A | 10/1932 | D'Olier, Jr. | |
| 1,891,756 A | 12/1932 | D'Olier, Jr. | |
| 3,985,417 A | 10/1976 | Fenton | |
| 4,645,286 A | 2/1987 | Isban et al. | |
| 4,645,289 A * | 2/1987 | Isban ....................... | H02G 3/20 |
| | | | 439/101 |
| 6,146,191 A | 11/2000 | Kerr, Jr. et al. | |
| 11,050,230 B1 | 6/2021 | Gretz | |

(Continued)

FOREIGN PATENT DOCUMENTS

WO    2021/046108 A1    3/2021

OTHER PUBLICATIONS

Office Communication (PCT Article 17(3)(a) and Rule 40.1 and 40.2(e)) issued on Jan. 30, 2025, in corresponding International application No. PCT/IB2024/061185, 15 pages.

*Primary Examiner* — Timothy J Thompson
*Assistant Examiner* — Amol H Patel
(74) *Attorney, Agent, or Firm* — XSENSUS LLP

(57) ABSTRACT

An orientation hub couples an electromechanical device, such as a luminaire with at least one bottom facing light source coupled, covered by an orientation specific lensed optics. The orientation hub enables the luminaire to rotate so as to direct light toward a targeted surface. Other devices (perhaps passive devices) coupled to the hub can be rotated to align with at least one surface or a like device by at least one of a string and a laser beam. For example, the laser beam can be projected through an array of luminaires' eye-loops that support the weight of the suspended from above luminaires.

20 Claims, 7 Drawing Sheets

(56) References Cited

U.S. PATENT DOCUMENTS

| | | |
|---|---|---|
| 11,788,692 B1 | 10/2023 | Spiro |
| 2003/0082948 A1* | 5/2003 | Hakkarainen ........... F21V 21/03 |
| | | 439/531 |
| 2014/0376220 A1 | 12/2014 | Shen et al. |
| 2015/0176761 A1* | 6/2015 | Lenherr .................. F21S 8/043 |
| | | 248/328 |
| 2016/0365691 A1 | 12/2016 | Khazeni |
| 2019/0013658 A1 | 1/2019 | Thomas |
| 2019/0338917 A1 | 11/2019 | Chen et al. |
| 2022/0243741 A1 | 8/2022 | Wang |

* cited by examiner

MONO-POINT ROTATIONAL CEILING COUPLED DEVICE CONNECTOR THAT CONVEYS ELECTRICAL POWER

CROSS-REFERENCE TO RELATED APPLICATION

The present application has common inventorship with, and contains subject matter related to that disclosed in U.S. Pat. No. 11,788,692, and also claims priority to U.S. patent application Ser. No. 18/381,231, filed Oct. 18, 2023 (now U.S. Pat. No. 11,901,718), and to U.S. patent application Ser. No. 18/406,136, filed Jan. 6, 2024, the entire contents of each of which being incorporated herein by reference.

BACKGROUND

Technical Field

The present disclosure relates to a mechanical/electromechanical connector for a suspended ceiling device with an integral mechanism for suspended ceiling device plumbing and orientation, and more particularly to such devices that convey power. In particular, this application describes mounting a mechanical or an electromechanical device from a support structure above, enabling alignment of the mechanical or electromechanical device by horizontal rotation.

Discussion of Background

Ceiling mounted suspended devices that are required to align with other ceiling suspended device(s) commonly require more than one point of mounting connectivity to a structure above. These mounting points of connectivity may be connected to a primary ceiling structure or to a secondary structure that couples to the primary structure. It is uncommon for all primary ceiling structure features of a building to be located directly above a plurality of mounting points for a ceiling suspended device. More commonly, an installer is required to install at least one additional secondary support structure with a device mounting point before extending a device suspension element from that mounting point. The suspended device is suspended from the at least two mounting points by at least one of a chain or an aircraft cable. The device suspended from the ceiling is typically required to be plumb, and/or oriented to align with at least one neighboring device mounted at the same height. The device suspended from the ceiling can be electrically powered as is the case with ceiling suspended lighting devices.

Power to ceiling mounted lighting devices is typically conveyed to the devices through ceiling mounted junction boxes ("J boxes"). The J boxes are typically positioned above or in proximity to the ceiling mounted devices. The ceiling mounted devices can be coupled to a J box by a rigid conduit. The J box can have a swivel joint connector that can restore at least the mounting elevation of the coupled device once it bumped by a moving object. However, the swivel connector does not restore the lighting device alignment with like neighboring device/s. Further, if the device's center of gravity is not co-aligned with the longitudinal vertical axis of the conduit, the device is subjected to undue stress.

In industrial and commercial buildings J boxes coupled to the ceiling's primary and/or secondary structures are fabricated of metal. The metal J boxes inherently have the structural capacity to support the weight of the suspended luminaires with their respective suspension elements. The ceiling suspended devices can receive their power or power and data from the J boxes coupled above or from conductors external to the J box. For example, an array of highbay lighting devices can receive power, or power and data, from a modular wiring system having a drop cord connect the powered device from the above structure.

Since the form, the size, the weight, and the center of gravity of the devices suspended from above vary, in some applications two mounting points of suspension from the ceiling may be required. Yet to save material costs and production time, installers prefer suspending ceiling suspended device/s requiring alignment by a mono-point connection.

U.S. Pat. No. 11,788,692 describes features associated with a rotational mechanical ceiling mounting device that is configured to support the load of a mechanical or electromechanical device coupled from below. The mechanical mounting device is comprised of two key elements—the first is fixed to the structure above, and the second rests on the first element and is free to rotate about the first element's central vertical axis. The mechanical or electromechanical device that is supported by the rotational mechanical mounting device couples to the second element of the mechanical mounting device that is free to rotate. The benefits of the mechanical mounting device include:
1. Ability to align a suspended device below with like neighboring device/s
2. Ability to align at least one light emitting device with orientation specific optics suspended below, with a targeted horizontal and/or vertical surface
3. Ability to convert a two-point device mounting system to a single point mounting system at the ceiling structure
4. Ability to restore device orientation when the device comes into contact with a moving object In addition to the above benefits, the present innovation describes the ceiling mounting orientation device's capability to convey power or power and data.

SUMMARY

The present disclosure extends the teachings of U.S. patent application Ser. No. 18/406,136 by separating the hub of the mounting orientation device from the J box that couples the hub to the mechanical or electromechanical device below. The present application shows by example the hub being physically coupled to an electromechanical device (e.g., a luminaire) rather than integrated with a J-box. In other embodiments, the coupled device can be a powered or a non-powered device. Regardless of the form of the coupled device, the hub couples to the electromechanical device at the vertical central axis of the device and/or the coupled device's central point of gravity.

Coupling the hub to a mechanical or an electromechanical device at, or in proximity to, the device's top surface enables suspending the assembly from at least one of a J box or a structural support member above. The means of suspension can be by at least one of a chain, a cable, and a conduit. Decoupling the mechanical or electromechanical device from the J box assembly shown in the prior applications has several benefits. These benefits include:
1. Ability to orient a suspended device by directly coupling the device to the support structure above, eliminating the need to first couple to a J box.
2. Ability to orient an electromechanical device at the device's set mounting level while the device is powered.

3. Conversion from two mounting connection points for orientation device orientation purpose to a single mounting point at support structure above.
4. Simplifying construction means and methods for ceiling suspended device alignment.
5. Consolidating mechanical and electrical construction processes into a single "one pass" process.
6. Material and labor cost reduction.

The present innovation applies to both mechanical and electromechanical devices. More specifically the present application describes an orientation hub that couples an electromechanical device. The electromechanical device is a luminaire with at least one bottom facing light source coupled, and covered by an orientation specific lensed optics. The orientation hub is configured to enable the luminaire to rotate so as to illuminate a targeted surface. Other un-powered devices coupled to the hub can be rotated to align with at least one surface or a like device by at least one of a string and a laser beam. For example, the laser beam can be projected through an array of luminaires' eye-loops that support the weight of the suspended from above luminaires.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5a includes a power/data cord that couples to the J box and FIG. 5b includes a power/data cord for the device that couples to a modular wiring system.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1A:
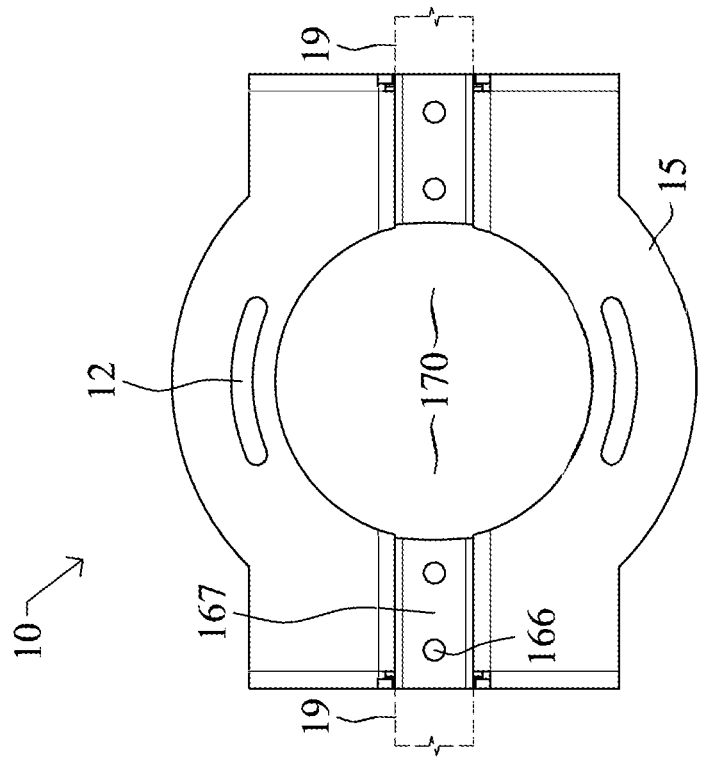
FIGS. 1a and 1b show enlarged top and bottom views of the rotational hub embodiments.
Figure 1B:
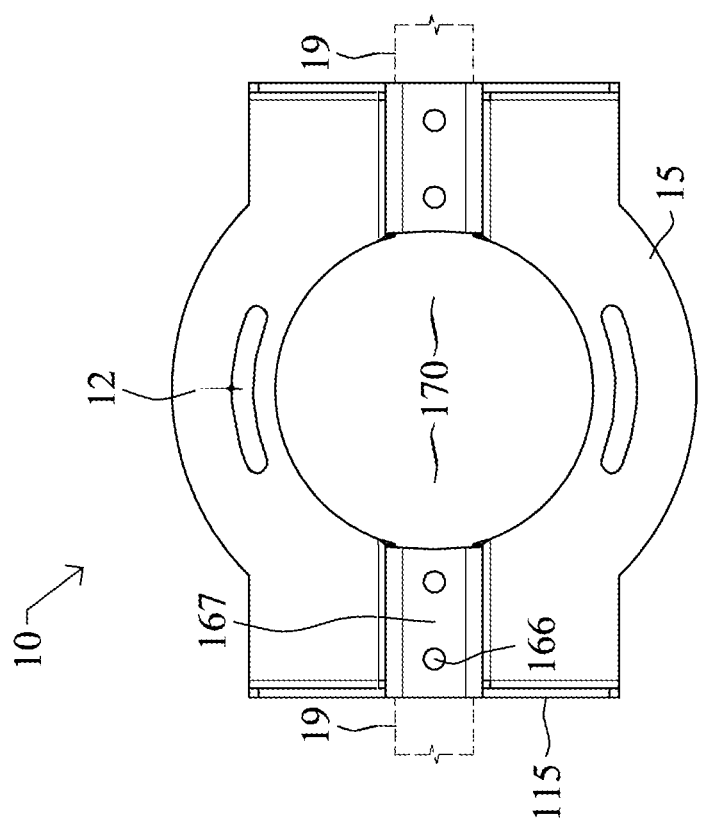

FIGS. 1a and 1b show enlarged top and bottom views of the rotational hub embodiments.

FIG. 1a shows a top view of hub 10. The hub 10 is functionally the same as the hub shown in U.S. patent application Ser. No. 18/406,136. In U.S. patent application Ser. No. 18/406,136 (see FIGS. 1a and 1b therein) the hub is shown resting on a J box flange wherein the J box is coupled to a support structure above. FIG. 1a and FIG. 1b in the present application show a portion of the hub's disk 15 trimmed to align the hub's disk 15 with the vertical walls of the luminaire device housing to which the hub couples. The elements shown include a central opening 170, an elongated bore (or opening) 12, the hub disk 15, an extender arm base 167, a mounting bore 166, and in dashed line a portion of an extender arm 19.

The hub 10 is configured to be mechanically coupled (e.g., via fasteners) to a top surface of a mechanical or electromechanical device (not shown). The hub 10 enables the alignment of a coupled device by rotational orientation. The hub 10 can be configured to be used with both mechanical and electromechanical embodiments of different shapes and sizes.

The present embodiment hub 10 is configured to couple to a luminaire (not shown) by two coupling protrusions 13 (FIG. 3b) configured to extend upwardly from the top surface of the luminaire's device housing. Each protrusion 13 can be a threaded studs that extend through the elongated bores 12 of the hub disk 15 upwardly with fasteners coupling the device to the hub disk 15. In different embodiments, bores formed in the top surface of the device can be configured to receive a threaded bolt from above through the elongated bore 12 of the hub disk 15.

Once coupled to the hub 10, the luminaire can pivot about its vertical axis using the elongated bore as guide tracks for aligning with at least one of, a like luminaire, a mechanical/electromechanical device, and a target surface to be illuminated by an orientation specific luminaire optics. The protrusions 13 coupled to the orientation hub 10 can provide at least one of a means to rotate a luminaire/device to align a luminaire with a like luminaire and/or orient luminaire optics to illuminate target surface. Orienting the luminaire can be done powered or non-powered.

The top surface of hub 10 can have marking corresponding to at least one reference marking on a surface of a coupled luminaire below or any other coupled device (not shown). The marking on hub 10 in relation to the at least one reference marking of the coupled device, can provide angular rotational displacement reading of the coupled device from base reference. Using the marking to rotationally orient the coupled luminaire/device about the central vertical axis of the hub 10 enables setting in place the device orientation prior to lifting and mounting the coupled assembly.

At opposite ends of the hub 10, hub extender arm bases 167 are configured to retain extender arms 19. The hub extender arm bases 167 are shown elevated above the surface of the hub's disk 15. The present figure shows partial extender arms 19 drawn in dashed line. The extender arms 19 are secured to the hub disk 15 by fasteners that can be placed from the top of the extender arm base 167 mounting bores 166. The extender arms 19 at the opposite ends are couple to a suspension cable or chain (not shown).

The cable or chain can couple directly to the extender arm/s 19 or couple to an intermediate fasteners like an eye loops that coupled the extender arms. The present figure also shows folds 115 in the hub disk 15 flat surface. The folds 115 provide the hub disk 15 extra structural strength to support the load imposed by the coupled device on the hub 10.

The hub central opening 170 is sized to accommodate at least one of power or power and data conductor/s connectivity to the luminaire device housing (not shown), through air flow for heat dissipation, switching devices, receptacles, and access to any other devices coupled to the top surface and or inside the luminaire device housing. The form and size of the rotational orientation hub 10 can vary to adapt to the form, size and weight of the device coupled from below.

Summarizing the coupled to a device (including a luminaire) rotational hub utility:
  a. The hub two-point suspension connectivity provides a redundant safety measure to protect life and property below. When one suspension member fails, the other has the structural capacity to support the suspended assembly.
  b. The hub two-point suspension connectivity maintains the orientation of the coupled device intact even when the device encounters a moving object.
  c. The hub enables the rotation of the coupled device to have it aligned with a surface and/or a like device. The alignment orientation can be performed powered or unpowered.
  d. The hub structure is structurally configured to securely support the entire assembly weight.
  e. The hub is an inexpensive and easy to fabricate structure that can be formed anywhere across the planet.
  f. The hub coupled to extender arms enables widening the distance between mounting suspension points where needed.

FIG. 1*b* shows the bottom side of hub 10 that is configured to, at least in part, to couple to the top surface of the luminaire device housing. The planar surface of hub disk 15 is substantially flat except for the inverted hub extender bases 167 that are located at opposite sides of the hub central opening 170. The inverted hub extender bases 167 show a plurality of mounting bores 166. The mounting bores 166 correspond to reciprocating bores in coupled extender/s arms 19 secured together by mechanical fastener/s. The hub 10 couples from above to a mechanical or electromechanical device and is configured to support the device weight with or without extenders.

Figure 2A:
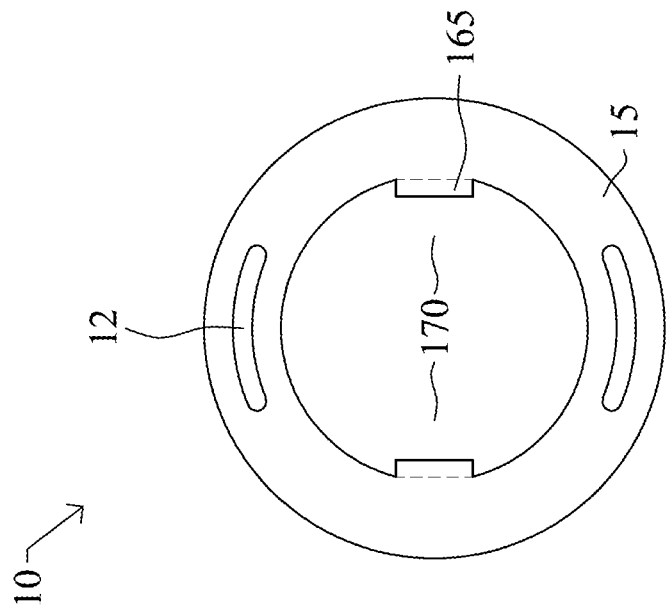
FIGS. 2a and 2b show enlarged top and bottom views of alternate rotational hub embodiments.
Figure 2B:
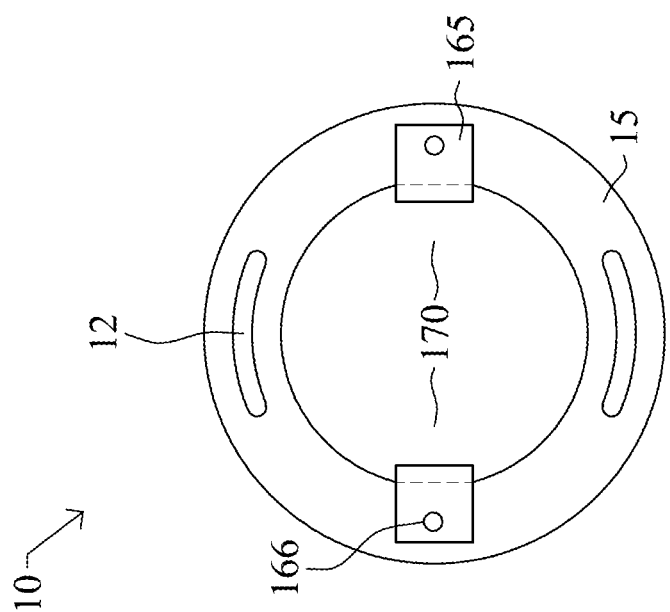

FIGS. 2*a* and 2*b* show enlarged top and bottom views of rotational alternate hub embodiments.

FIG. 2*a* shows an exemplary top view of an alternate hub 10'. The alternate hub 10' is configured as a streamlined embodiment of the hub shown in FIGS. 1*a* and 1*b*. The alternate hub 10' excludes a provision for extender arms and is configured to be directly mounted to a support structure above or to a J box above. Functionally the alternate hub 10' is configured to perform the same device alignment task as the orientation hub 10 shown in FIGS. 1*a* and 1*b*. The alternate hub 10' coupled to the mechanical or the electromechanical device, is configured to align the device coupled from below to at least one of, a like device, a horizontal axis, and a vertical surface.

At least one defining feature of the alternate hub 10' is its mounting tab 165. The present figure shows the alternate hub mounting tab 165 extending upwardly from an inner perimeter of the hub central opening 170. In at least one different embodiment, the hub mounting tab 165 can extend upwardly and/or sideways from the exterior perimeter of the alternate hub 10'. The mounting hub tab 165 has at least one mounting bore 166. The mounting bore 166 is configured to couple to suspension cable/s or chains directly or indirectly by an intermediate fastener.

The alternate hub 10' is configured to couple to a top surface of a mechanical or an electromechanical device. The alternate hub 10' can couple mechanical and electromechanical devices of different weights, shapes, and sizes. The present application describes an alternate hub 10' coupled to a luminaire. The present figure of the alternate hub 10' shows two elongated through bores 12 at opposite sides of the alternate hub central opening 170. The alternate hub 10' couples to the luminaire by protrusion 13 that extend upwardly through the elongated bores 12.

The protrusions 13 extend through the elongated bore 12 of the hub disk 15 securing the hub disk 15 to the luminaire by fasteners from above (not shown). Once coupled to the alternate hub 10', the luminaire can pivot about its central vertical axis using the elongated bore 12 as guide tracks for alignment. The alternate hub 10' in its various configurations facilitates alignment of luminaires that employ orientation specific optics.

Each protrusion 13 can be a threaded stud that extends through the elongated bores 12 of the hub disk 15 upwardly with fasteners coupling the device to the hub disk 15. In different embodiments, bores formed in the top surface of the device can be configured to receive a threaded bolt from above through the elongated bore 12 of the hub disk 15.

The luminaire powered or unpowered can be rotated horizontally about its vertical central axis to optimally illuminate a targeted surface. Once oriented in position, the luminaire or any other coupled device can be secured to the hub disk 15 by fasteners that couple to the through protrusions 13 in the elongated bore. The secured assembly, even if it encounters (e.g., is bumped by) a moving object, will always revert to its secured orientation position.

The top surface of the alternate hub 10' can have marking/s corresponding to at least one reference marking on a surface of a coupled luminaire below or any other coupled device (not shown). The marking on the alternate hub 10' in relation to the at least one referenced marking of the coupled device, can provide angular rotational displacement reading of the coupled device from base reference. Using the marking to rotationally orient the coupled luminaire/device about the central vertical axis of the alternate hub 10' enables setting in place the device orientation prior to lifting and mounting the coupled assembly.

The alternate hub central opening 170 is configured to allow at least one of, power or power and data conductor connectivity to the luminaire device housing (not shown), through air flow for heat dissipation, switching devices, receptacles, and access to any other devices coupled to the top surface and or inside the luminaire device housing. The form and size of the rotational orientation hub 10 and the rotational orientation alternate hub 10' can vary to adapt to the form, size, and weight of the device coupled from below.

Summarizing the coupled to a device (including a luminaire) rotational alternate hub utility:
  a. The hub two-point suspension connectivity provides a redundant safety measure to protect life and property below. When one suspension member fails, the other has the structural capacity to support the suspended assembly.
  b. The hub two-point suspension connectivity maintains the orientation of the coupled device intact even when the device encounters a moving object.

c. The hub enables the rotation of the coupled device to have it aligned with a surface and/or a like device. The alignment orientation can be performed powered or unpowered.

d. The hub structure is structurally configured to securely support the entire assembly weight.

e. The hub is an inexpensive and easy to fabricate structure that can be formed anywhere across the planet.

FIG. 2b shows the bottom side of an alternate hub 10' that is configured to, at least in part, couple to the top surface of a luminaire device housing. The planar surface of the hub disk 15 is substantially flat. Inside and at opposite sides of the hub central opening 170, hub mounting tabs 165 are shown extending away from the alternate hub disk 15. Elongated bores in the hub disk 15 shown at opposite sides of the hub central opening 170 are configured to receive reciprocating through protrusions 13 that extend upwardly from the top surface of the luminaire device housing or any other coupled device.

Figure 3A:
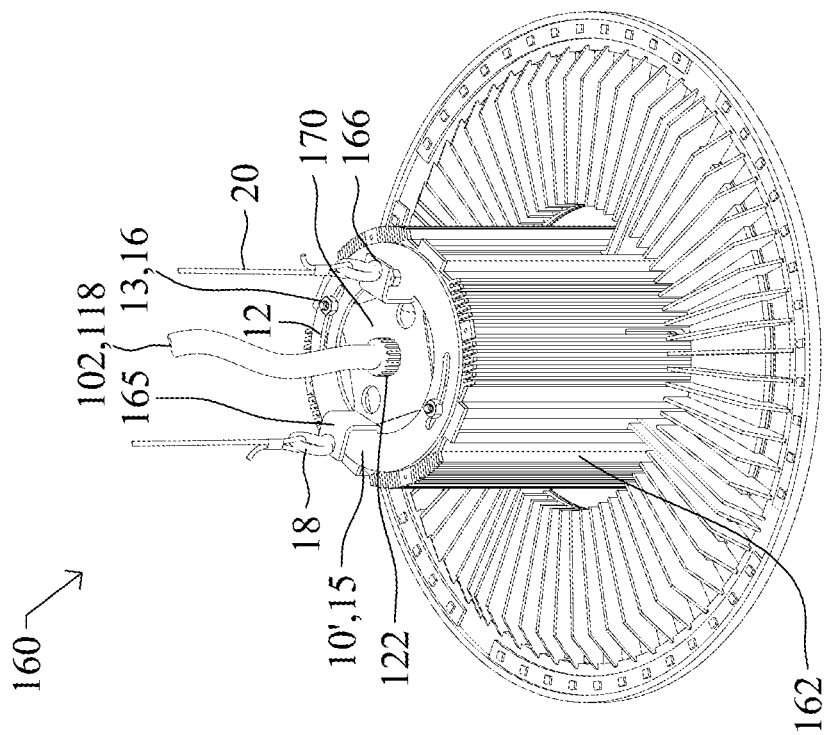
FIGS. 3a and 3b show perspective views of the rotational hubs shown in FIGS. 1a, 1b, 2a, and 2b respectively coupled to a luminaire without a refractor.
Figure 3B:
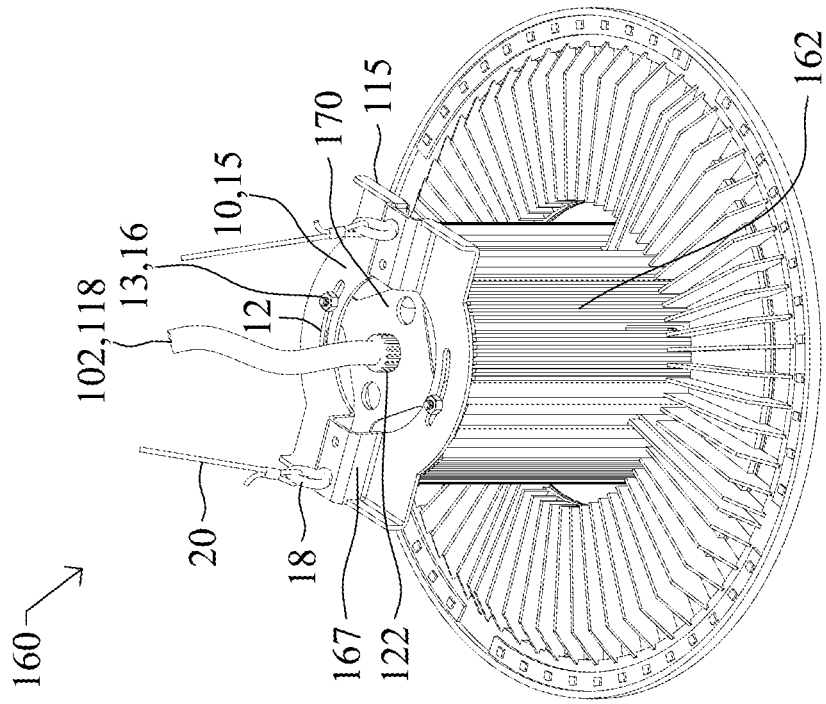

FIGS. 3a and 3b show perspective views of the rotational hubs shown in FIGS. 1 and 2 respectively coupled to a luminaire without a refractor.

FIG. 3a shows the top view of the rotational hub 10 coupled to a top portion of a luminaire 160. The assembly includes a luminaire device housing 162 coupled to the rotational hub 10 from below. Above, eye loops 18 coupled to the hub 10 with aircraft cables 20 extending to the above. The aircraft cables suspend the assembly from a support structure or a J box above (not shown). In a different embodiment aircraft cables/chains 20 can directly couple to the mounting bores of the hub 10 extender arm base 167.

At the center of the hub 10, a power or power and data drop cord 102 is shown coupled to the top surface of the luminaire device housing 162. The drop cord 102, 118 can be configured to couple by a coupler 122 to a reciprocating "plug'n play" connector in the luminaire device housing 162. Bores shown on the top of the luminaire device housing 162 can be configured for at least one of, receive additional conductor, receive an IoT device, couple to a switching device and/or provide a venting opening to dissipate heat rising from below.

Elongated bores 12 in the hub disk are shown at opposite sides of the hub central opening. Protrusions 13 extending upwardly through the elongated bores 12 from the top surface of the luminaire device housing 162 secure the luminaire 160 to hub 10 by mechanical fasteners 16. When aligning the luminaire 160, the luminaire 160 is free to travel along the elongated bore 12 guide track to the desired alignment position. Once there, the mechanical fastener locks the assembly in its permanent orientation position.

FIG. 3b shows the top view of the rotational alternate hub 10' coupled from above to a top portion of a luminaire 160 device housing 162. Above, eye loops 18 are shown coupled to the hub mounting tabs 165. The eye loops 18 are also shown coupled to aircraft cables 20 that extend upwardly. The aircraft cables 20 suspend the assembly from a structure above (not shown). In a different embodiment the aircraft cables/chains 20 can directly couple to the mounting bores 166 of the alternate hub 10'.

At the center of the alternate hub 10' a power or power and data drop cord 102, 118 is shown coupled to the top surface of the luminaire device housing 162. The drop cord 102, 118 can be configured to couple by a coupler 122 to a reciprocating "plug'n play" connector in the luminaire device housing 162. Bores shown on the top of the luminaire device housing 162 can be configured for at least one of, an additional conductor, an IoT device, a switching device, and/or a venting aperture.

Elongated bores 12 in the hub disk 15 are shown at opposite sides of the hub central opening 170. Mechanical fasteners 16 coupled to the protrusion 13 that extend upwardly through the elongated bores 12 secure the luminaire device housing 162 to the alternate hub 10'. When aligning the luminaire 160, the luminaire is free to travel along the elongated bore 12 guide track to the desired alignment position. Once there, the mechanical fastener 16 locks the assembly in its permanent orientation position.

Figure 4A:
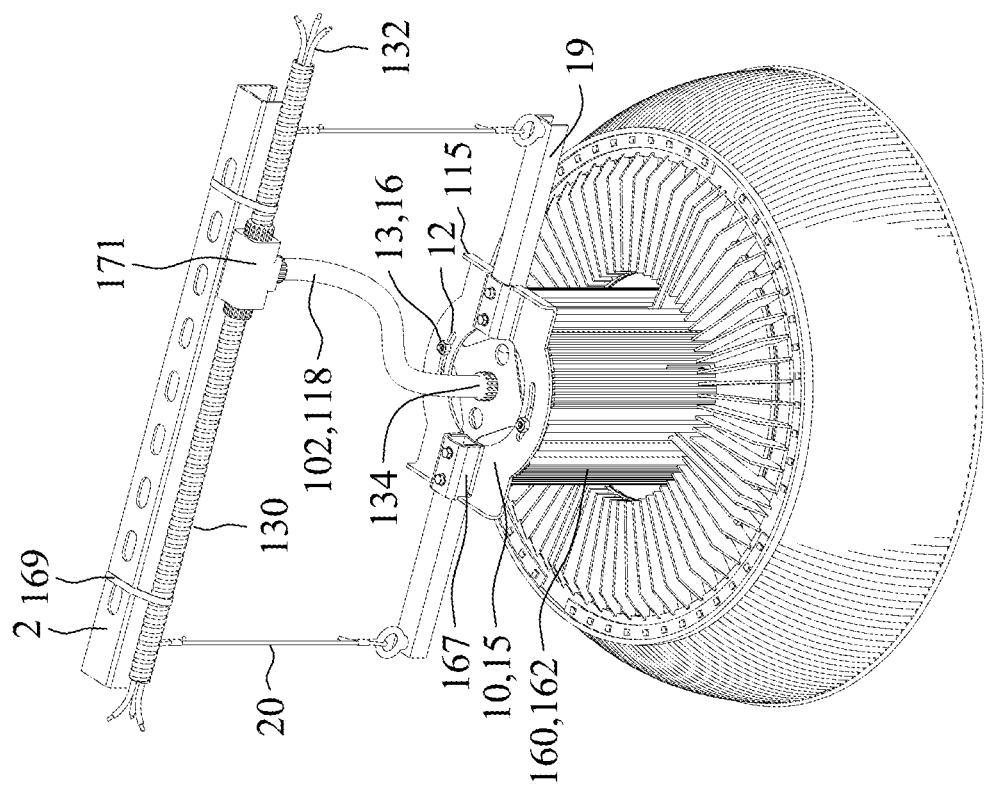
FIGS. 4a and 4b are perspective views of luminaires coupled to orientation hubs corresponding to FIG. 1a with extenders. The luminaires are directly suspended by aircraft cables from the support structure above. Power/data is conveyed to the luminaire in FIG. 4a through a J box and in FIG. 4b by modular wiring drop cord.
Figure 4B:
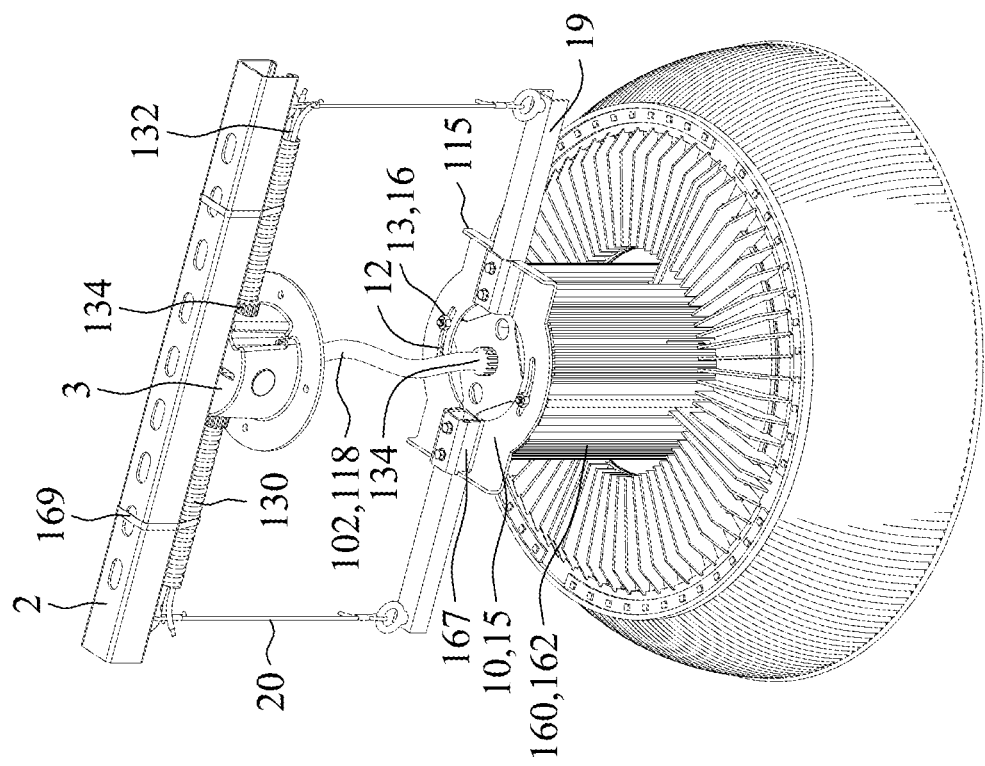

FIGS. 4a and 4b show perspective views of luminaires coupled to orientation hubs with extender arms corresponding to FIG. 1a hub.

FIG. 4a shows a luminaire 160 coupled to a hub 10 with extender arms 19 extending outwardly. The assembly including the luminaire 160 and the hub 10 are suspended from a support structure 2 above by aircraft cables 20 that couple to the extender arms 19. Power or power and data to the luminaire originate/s from inside the J box 3.

The elements shown include the rotational hub 10, 15 coupled from above to the luminaire device housing 162. Extender arms 19 coupled to the extender base 167 of the hub 10 are shown extending outwardly. Aircraft cables 20 coupled to the extender arms 19 below on the other end are coupled to the support structure 2 above. The entire assembly weight including the luminaire (device) coupled, the hub 10, the extender 19 and the suspension cables 20 with corresponding fittings of the present figure are directly supported by the support structure 2.

The coupling of the hub disk 15 to the luminaire device housing 162 gives the luminaire its rotational capability. Protrusions 13 extending through the elongated bores 12 fasten the hub disk 10, 15 to the luminaire 160, 162. Fastened by fasteners 16 from above, the hub disk 15 gives the luminaire the rotational ability for rotational orientation as well as, once aligned, fixates, and secures the assembly in place.

The present figure shows a power or power and data conductor 102,118 coupled at one end to the luminaire device housing 162 and at the other end coupled to a J box 3. Above, power or power and data extender cables 130 are shown coupled to the J box and supported by straps 169 to the support structure 169. The power/data extender cables 130 shown can include at least one conductor 132 that conveys power/data to the J box 3 and a plurality of conductors 132 inside cables and/or cords that convey power or power and data to a device mounted below and power consuming devices in the vicinity.

A power/data distribution hub (not shown) can be housed inside the J box 3. The power/data distribution hub can be an element of a factory preconfigured modular wiring system. The extender cables 130 can couple the power/data distribution hub directly by couplers 134 wherein the power distribution hub position inside the J box 3 is fixed. The power/data distribution hub can be coupled to the J box 3 cover.

The conductor 102, 118 of the luminaire can couple the power/data distribution hub through the J box cover by a coupler. The conductor 102, 118 can be supplied with the modular wiring system elements and can be field installed. The field installed conductors can couple to a reciprocating "plug n' play" receptacle disposed on a surface of the device below. In other embodiments, power/data can be delivered to a luminaire through the J box by conventional pipe and wire assembly.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

FIG. 4b shows a luminaire 160 coupled to a hub 10 with extender arms extending outwardly. The assembly including the luminaire 160 and the hub 10 are suspended directly from a support structure 2 above by aircraft cables 20 that couple to the extender arms 19. Power or power and data to the luminaire 160 is/are conveyed by means of modular wiring system from above.

The elements shown include a rotational hub 10, 15 coupled from above to the luminaire device housing 162. Extender arms 19 coupled to the extender base 167 of the hub 10 are shown extending outwardly. Aircraft cables 20 coupled to the extender arms 19 below on the other end are coupled to the support structure 2 above. The entire assembly weight including the luminaire (device) coupled, the hub 10, the extender 19 and the suspension cables 20 with corresponding fittings of the present figure are directly supported by the structure 2.

The coupling of the hub disk 15 to the luminaire device housing 162 gives the luminaire its rotational capability. Protrusions 13 extending through the elongated bores 12 of the hub disk 10, 15 fasten the luminaire 160, 162 to the hub 10. Fastened by fasteners 16 from above, the hub disk 15 gives the luminaire the rotational ability for rotational orientation as well as, once aligned, fixates, and secures the assembly in place.

The present figure shows a power or power and data conductor 102, 118 coupled at one end to the luminaire device housing 162 and at the other end to a modular wiring system splitter 171. The power or power and data cables 130 are shown coupled to the support structure 2 by straps 169. The power/data extender cables 130 shown can include at least one conductor 132 that conveys power/data through the splitter 171 to power consuming devices beyond. Through the splitter 171 the power/data can be conveyed to conductor/s 102, 118 that conveys power/data to a device coupled by a coupler 134 to the luminaire 160 below and at least one additional power/data consuming device in the vicinity. In other embodiments where modular wiring systems are not used, power/data can be delivered to a luminaire by a conventional pipe and wire assembly that can include a J box.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

Figure 5A:
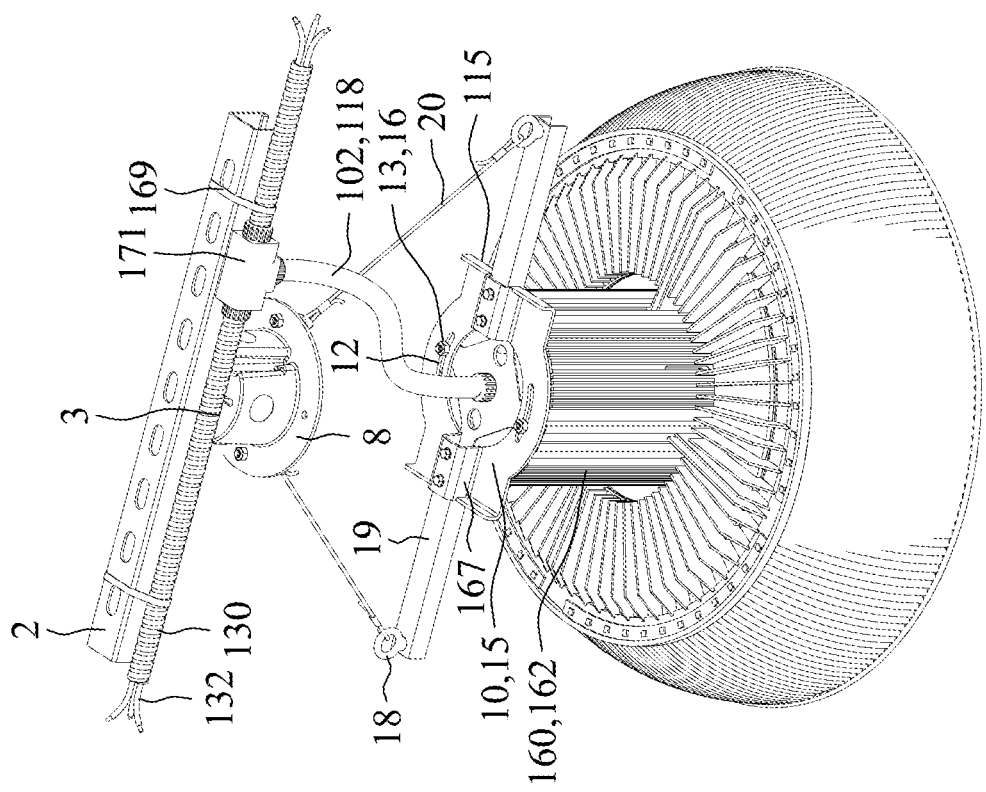
FIGS. 5a and 5b show perspective view of luminaires with extenders coupled to the orientation hub of FIG. 1a. The assembly is suspended by aircraft cables from a J box flange of a J box coupled to support structures above.
Figure 5B:
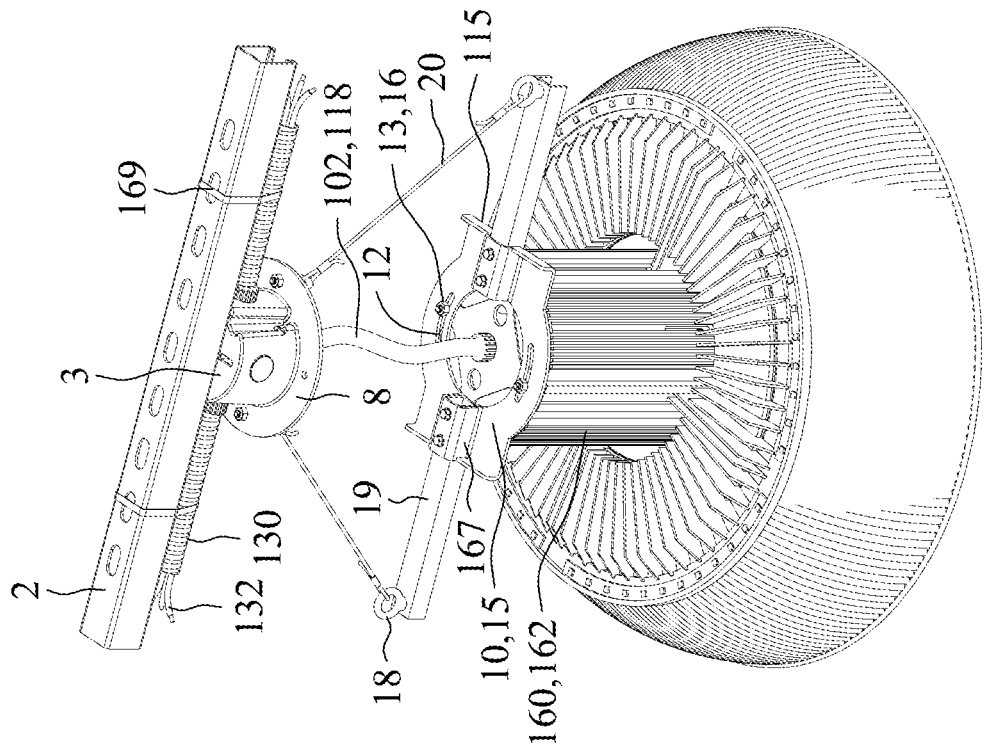

FIGS. 5a and 5b show perspective views of luminaires coupled to orientation hubs with extender arms corresponding to FIG. 1a. Both figures show the device assemblies mechanically supported by a J box.

FIG. 5a shows a luminaire 160 coupled to a hub 10 with extender arms 19 extending outwardly. The assembly including the luminaire 160 and the hub 10 is suspended from a support structure 2 above by aircraft cables 20 that couple to the extenders 19. Power or power and data to the luminaire 160 originate/s from inside the J box 3.

The elements shown include the rotational hub 10, 15 coupled from above to the luminaire device housing 162. Extender arms 19 coupled to the extender base 167 of the hub 10 are shown extending outwardly. Aircraft cables 20 coupled to the extender arms 19 at one end are coupled to a J box flange 8 of J box 3 above at the other end. The J box 3 couples to the support structure 2 and it is fixed in position.

The aircraft cables 20 of the present embodiment are shown coupled to eye loops 18 that in turn couple to the extenders 19. In other embodiments, the suspension device can couple directly to the extenders' mounting bores on the hub's extender base 167. The entire assembly weight including the luminaire (device) coupled, the hub 10, the extenders 19, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 fasten the hub disk 10, 15 to the luminaire 160, 162. Fastened by fasteners 16 from above, the hub disk 15 gives the luminaire the rotational ability for device orientation as well as, once aligned, fixates, and secures the assembly in place.

The present figure shows a power or power and data conductor 102, 118 coupled at one end to the luminaire device housing 162 and coupled at the other end to the J box 3. Above, power or power and data cables 130 are shown coupled to the J box and supported by straps 169 to the support structure 2. The power/data extender cables 130 shown can include at least one conductor 132 that conveys power/data to the J box 3 and a plurality of conductors 132 inside cables and/or cords that convey power or power and data to a device mounted below and power consuming devices in the vicinity.

A power/data distribution hub (not shown) can be housed inside the J box 3. The power/data distribution hub can be an element of a factory preconfigured modular wiring system. The extender cables 130 can couple the power/data distribution hub directly by couplers wherein the power distribution hub position inside the J box 3 is fixed. The power/data distribution hub can be coupled to the J box 3 cover.

The conductor 102, 118 of the luminaire can couple the power/data distribution hub by a coupler and/or can be supplied with the balance of the modular wiring system elements and in the field couple to a reciprocating "plug n' play" receptacle disposed on a surface of the luminaire/device below. In other embodiments, power/data can be delivered to a luminaire through the J box by conventional pipe and wire assembly.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

FIG. 5b shows a luminaire 160 coupled to a hub 10 with extender arms 19 extending outwardly. The assembly including the luminaire 160 and the hub 10 is suspended from a J box 3 above by aircraft cables 20 that couple to the extender arms 19. Power or power and data to the luminaire is/are conveyed externally to the J box 3 by means of modular wiring from above.

The elements shown include a rotational hub 10, 15 coupled from above to the luminaire device housing 162. Extender arms 19 coupled to the extender base 167 of the hub 10 are shown extending outwardly. Aircraft cables 20 coupled to the extender arms 19 at one end are coupled to a J box flange 8 of J box 3 above at the other end. The J box 3 couples to the support structure 2 and it is fixed in position.

The aircraft cables 20 of the present embodiment are shown coupled to eye loops 18 that in turn couple to the extenders 19. In other embodiments, the suspension device can couple directly to the extenders' mounting bores of the hub's extender base 167. The entire assembly weight including the luminaire (device) coupled, the hub 10, the extenders 19, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 of the hub disk 15 fasten the hub disk 15 to the luminaire 160, 162 by fasteners 16 from above. The hub disk 15 gives the luminaire the rotational ability for orientation as well as, once aligned, fixates, and secures the assembly in place.

The present figure shows a power or power and data conductor 102, 118 coupled at one end to the luminaire device housing 162 and at the other end to a modular wiring system splitter. The power or power and data cables 130 are shown coupled to the support structure 2 by straps 169. The power/data extender cables 130 shown can include at least one conductor 132 that conveys power/data through the splitter 171 to power consuming devices beyond.

Through the splitter 171 the power/data can be conveyed to conductors 102, 118 that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

Figure 6A:
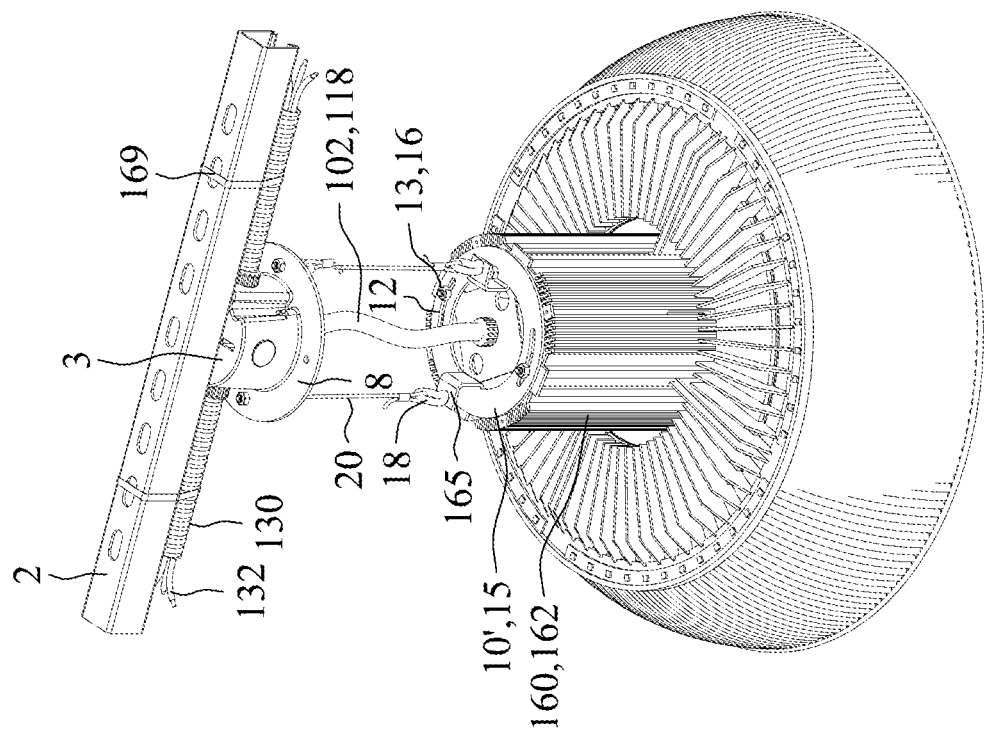
FIGS. 6a and 6b show perspective views of luminaires coupled to orientation hubs corresponding to FIGS. 1a and 2a respectively. The luminaires are suspended by aircraft cables from a J box flange that is coupled to a support structure above. Power/data is conveyed to the luminaire through the J box.
Figure 6B:
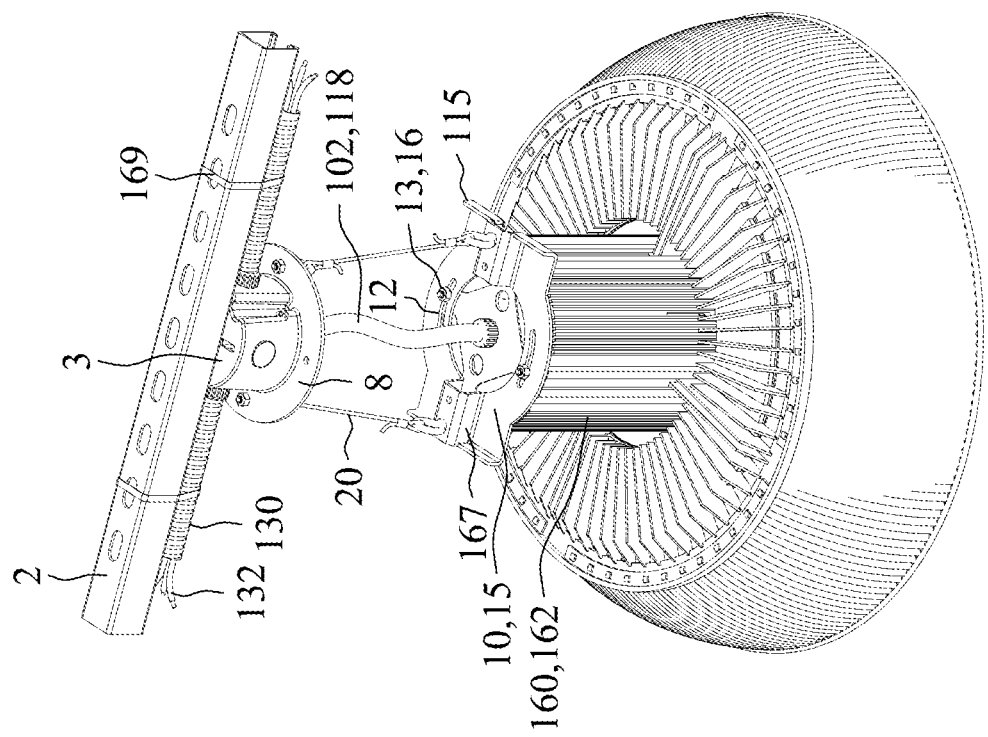

FIGS. 6a and 6b show perspective views of luminaires coupled to orientation hubs corresponding to FIGS. 1a and 2a respectively. The luminaires are suspended by aircraft cables from a J box flange that is coupled to a support structure above.

FIG. 6a shows a luminaire coupled to a rotational hub 10. The hub 10 shown is suspended from above by aircraft cables 20. The cables 20 at one end are coupled to the hub 10 and on the other end are coupled to a flange 8 of a J box 3 above. The J box 3 is fixated to the above support structure 2. Power or power and data to the luminaire 160 originate/s from inside the J box 3.

The elements shown include the rotational hub 10, 15 coupled from above to the luminaire device housing 162. The aircraft cables 20 of the present embodiment are shown coupled to I-loops 18. The entire assembly weight including the luminaire (device) coupled, the hub 10, the extenders 19, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 of the hub disk 15 fasten by fasteners 16 the hub 10, 15 and the luminaire 160, 162 assembly from above. The hub disk 15 provides the luminaire (device) its rotational ability for horizontal rotational orientation, and can also, once aligned, fixate and secure the assembly in place.

The present figure shows a power or power and data conductor 118 coupled at one end to the luminaire device housing 162 and coupled at the other end to the J box 3. Above, power or power and data extender cables 130 are shown coupled to the J box 3 and supported by straps 169 to the support structure 2. The power/data extender cables 130 shown can include at least one conductor 132 that conveys power/data to the J box 3 and a plurality of conductors 132 inside cables and/or cords that convey power or power and data to a device mounted below and power consuming devices in the vicinity.

A power/data distribution hub (not shown) can be housed inside the J box 3. The power/data distribution hub can be a standard factory preconfigured modular wiring system component. The extender cables 130 can couple the power/data distribution hub directly by couplers wherein the power distribution hub position inside the J box 3 is fixed. The power/data distribution hub can be coupled to the J box 3 cover.

The conductor 118 of the luminaire can couple the power/data distribution hub by a coupler and/or can be supplied with the balance of the modular wiring system components. This component can be field coupled to a reciprocating "plug n' play" receptacle disposed on a surface of the device below. In other embodiments, power/data can be delivered to a luminaire through the J box by conventional pipe and wire assembly.

The present figure demonstrates one example of an "all in one" luminaire assembly construction method wherein the mechanical, electrical and luminaire alignments can be accomplished in one step. This method is contrary to more traditional construction practices that require at least two passes.

FIG. 6b shows a luminaire coupled to a rotational alternate hub 10'. The alternate hub 10' shown is suspended by aircraft cables 20. The cables 20 at one end are coupled to the hub 10 and on the other end are coupled to a flange 8 of a J box 3 above. The J box 3 is fixated to the above support structure 2. Power or power and data to the luminaire 160 originate/s from inside the J box 3.

The elements shown include the rotational alternate hub 10, 15 coupled from above to the luminaire device housing 162. The aircraft cables 20 of the present embodiment are shown coupled to eye loops 18 that in turn couple to the hub mounting tables 165 of the alternate hub 10'. In other embodiments, the suspension device can couple directly to mounting bores 166 of the hub mounting tabs 165. The entire assembly weight including the luminaire (device) coupled, the hub 10, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 of the hub disk 15 fasten by fasteners 16 the hub 10, 15 and the luminaire 160, 162 assembly from above. The hub disk 15 provides the luminaire (device) its rotational ability for horizontal rotational orientation, and can also, once aligned, fixate and secure=the assembly in place.

The present figure shows a power or power and data conductor 118 coupled at one end to the luminaire device housing 162 and at the other end to a modular wiring system splitter. The power or power and data cables 130 are shown coupled to the support structure 2 by straps 169. The power/data extender cables 130 shown can include at least one conductor 132 that conveys power/data through the splitter to power consuming devices beyond.

Through the splitter the power/data can be conveyed to conductors 118 that conveys power/data to a device coupled below and at least one additional power/data consuming device in the vicinity. In other embodiments where modular wiring system is not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

Figure 7A:
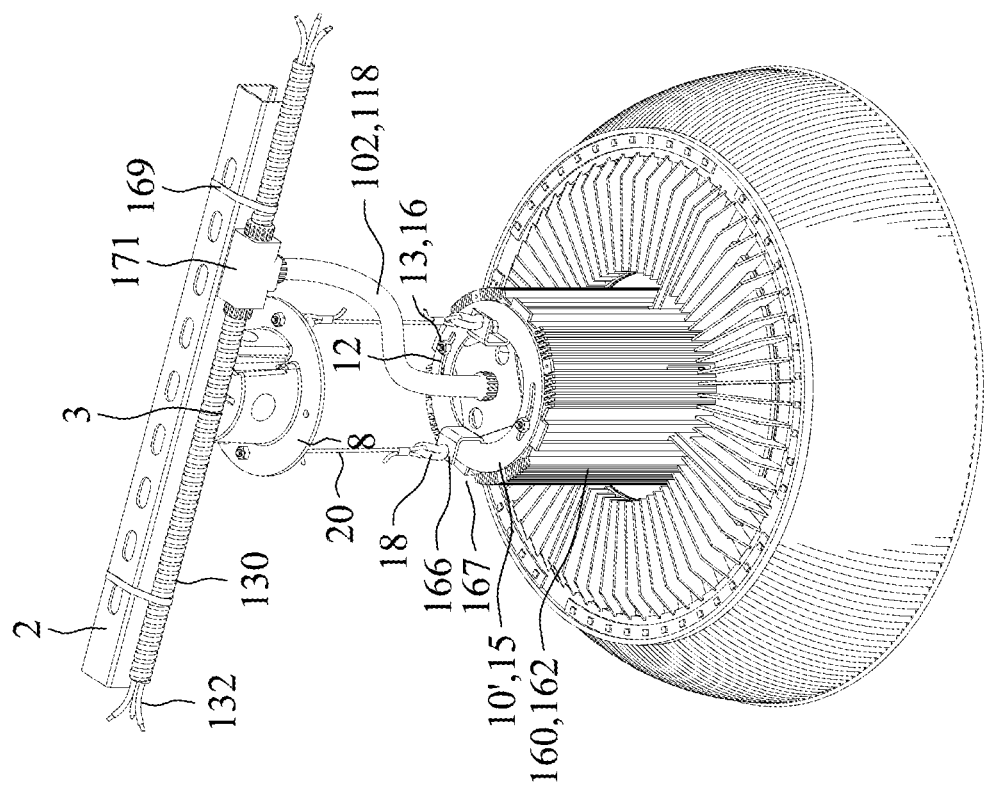
FIGS. 7a and 7b show perspective view of luminaires coupled to orientation hubs corresponding to FIGS. 1a and 2a respectively. The luminaires are suspended by aircraft cables from a J box flange that is coupled to support structures above. Power/data is conveyed to the luminaire externally to the J box by means of modular wiring cables.
Figure 7B:
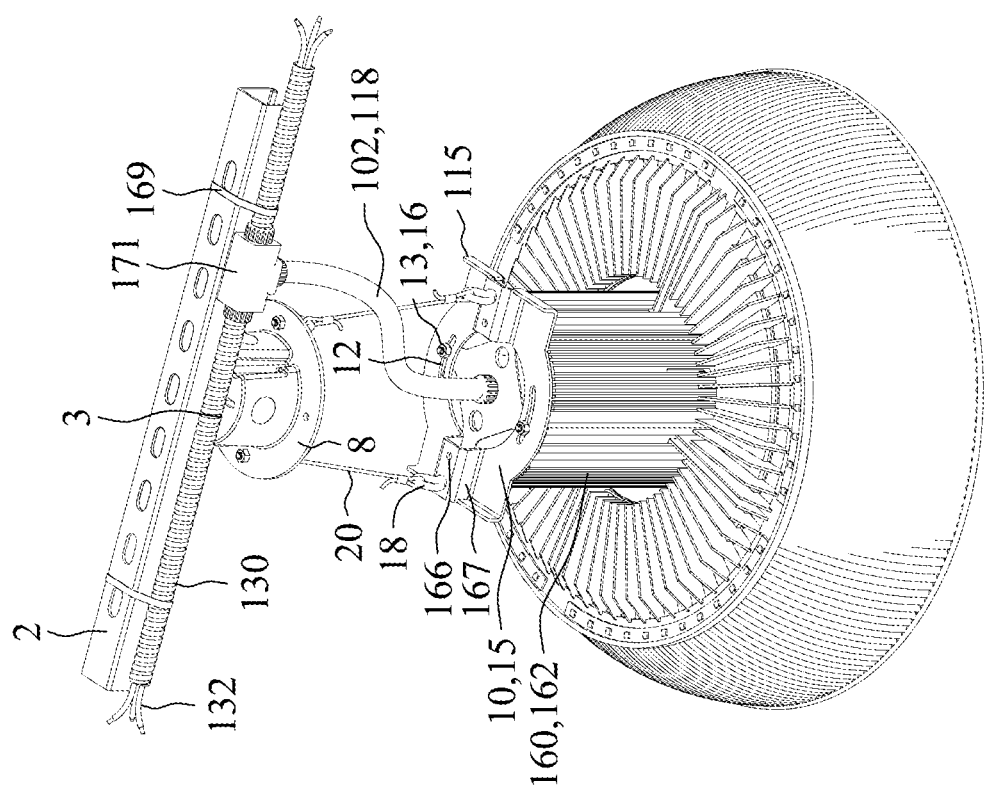

FIGS. 7a and 7b show perspective views of luminaires coupled to orientation hubs corresponding to FIGS. 1a and 2a respectively. The luminaires are suspended by aircraft cables from a J box flange that is coupled to support structures above. Power/data is conveyed to the luminaire externally to the J box by means of modular wiring cables.

FIG. 7a shows a luminaire coupled to a rotational hub 10. The hub 10 shown is suspended by aircraft cables 20.

The aircraft cables 20 at one end are coupled to the hub 10 and on the other end are coupled to a flange 8 of a J box 3 above. The J box 3 is fixated to the above support structure 2. Power or power and data to the luminaire 160 originate/s externally to the J box 3.

The elements shown include the rotational hub 10, 15 coupled from above to the luminaire device housing 162. The aircraft cables 20 of the present embodiment are shown coupled to I-loops 18 that in turn couple to the extender base 167 of the hub 10. In other embodiments, the suspension devices can couple directly to mounting bores 166 of the extension base 167. The entire assembly weight including the luminaire (device) coupled, the hub 10, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 of the hub disk 15 fasten by fasteners 16 the hub 10, 15 and the luminaire 160, 162 assembly from above. The hub disk 15 provides the luminaire (device) its rotational ability for horizontal rotational orientation, and can also, once aligned, fix and secure the assembly in place.

The present figure shows a power or power and data conductor 118 coupled at one end to the luminaire device housing 162 and at the other end to a modular wiring system splitter 171. The power or power and data cables 130 are shown coupled to the support structure 2 by straps 169. The power/data extender cables 130 shown can include at least one conductor 132 that conveys power/data through the splitter to power consuming devices beyond.

Through the splitter 171 the power/data can be conveyed to conductors 118 that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

FIG. 7b shows a luminaire 160 coupled to a rotational alternate hub 10'. The alternate hub 10' shown is suspended by aircraft cables 20. The aircraft cables 20 at one end are coupled to the rotational alternate hub 10' and on the other end are coupled to a flange 8 of a J box 3 above. The J box 3 is fixated to the above support structure 2. Power or power and data is conveyed to the luminaire 160 externally to the J box 3.

The elements shown include the rotational alternate hub 10', 15 coupled from above to the luminaire device housing 162. The aircraft cables 20 are shown coupled to I-loops 18 that in turn couple to the hub mounting tables 165 of the alternate hub 10'. In other embodiments, the suspension device can couple directly to mounting bore 166 of the hub mounting tab 165. The entire assembly weight including the luminaire (device) coupled, the hub 10, and the suspension cables 20 with corresponding fittings are supported by the J box flange 8.

The coupling of the hub disk 15 to the luminaire device housing 162 gives the luminaire its rotational capability. Protrusions 13 extending through the elongated bores 12 of the hub disk 15 fasten by fasteners 16 the hub 10, 15 and the luminaire 160, 162 assembly from above. The hub disk 15 provides the luminaire (device) its rotational ability for horizontal rotational orientation, and can also, once aligned, fixate and secure the assembly in place.

The present figure shows a power or power and data conductor 118 coupled at one end to the luminaire device housing 162 and at the other end to a modular wiring system splitter 171. The power or power and data cables 130 are shown coupled to the support structure 2 by straps 169. The power/data extender cables 130 shown can include at least one conductor 132 that conveys power/data through the splitter to power consuming devices beyond.

Through the splitter 171 the power/data can be conveyed to conductors 118 that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

| | ELEMENT LIST |
|---|---|
| 1. | Connector |
| 2. | Ceiling Support Structure |
| 3. | J box |
| 4. | J box Exterior Wall |
| 5. | Device Alignment Bore |
| 6. | J box Knockout Opening |
| 7. | J box Cover |
| 8. | J box Flange |
| 9. | Flange Bore |
| 10. | Hub |
| 11. | Collar |
| 12. | Elongated Bore |
| 13. | Protrusion |
| 14. | Protrusion Bore |
| 15. | Hub Disk |
| 16. | Fastener |
| 17. | Hub Mounting Bore |
| 18. | Eye Loop/Hook Fastener |
| 19. | Extender Arm |
| 20. | Cable and/or Chain |
| 21. | Conductor |
| 22. | Receptacle |
| 23. | Power Consuming Device |
| 24. | Circuitry Busway Hub |
| 25. | Switching Device |
| 26. | Central Through Opening |
| 28. | Safety Bore |
| 29. | Lock Bolt |
| 30. | Ceiling Suspended Device |

-continued

| | ELEMENT LIST |
|---|---|
| 100. | Power Distribution Hub (PDH) |
| 102. | Drop Cord (DC) |
| 104. | DC Receptacle |
| 106. | Insulated Hub Core |
| 108. | Circuit Selector |
| 110. | Hub's Mechanical Key |
| 112. | Data Port |
| 114. | J box Cover plate Bore |
| 115. | Hub Fold |
| 116. | Cover Plate to PDH |
| 118. | DC Conductor |
| 120. | DC Coupler |
| 122. | DC Electrical Plug |
| 130. | Extender Cable (EC) |
| 132. | EC Conductor |
| 134. | EC Coupler |
| 136. | EC Electrical Plug |
| 138. | EC Receptacle |
| 140. | EC Plug Mechanical Key |
| 142. | EC Insulated Plug Core |
| 146. | EC Plug Terminal Contacts |
| 148. | Coupler Fastening Ring |
| 150. | Coupler Threaded Extension |
| 152. | J box Through Opening |
| 154. | J box Cover Through Opening |
| 156. | J box Cover to PDH Bore |
| 158. | PDH Threaded Bore |
| 160. | Luminaire |
| 162. | Luminaire's Device Housing |
| 164. | J box Threaded Bore |
| 165. | Hub Mounting Tab |
| 166. | Mounting Bore |
| 167. | Extender Base |
| 168. | Reflector/Refractor |
| 169. | Conductor Strap |
| 170. | Hub Central Opening |
| 171. | Conductor Splitter |
| 180. | Mounting Device Conveying Power |

The invention claimed is:

1. A mechanical or an electromechanical device comprising:
a tensile support including at least of a cable or a chain;
a mounting orientation hub coupled via the tensile support to an overhead support structure, the mounting orientation hub includes
an elongated bore,
at least one protrusion that extends upwardly away from a top surface of the mechanical or electromechanical device, the at least one protrusion is extendable through the elongated bore; and
a fastener coupled to the at least one protrusion couples the mechanical or the electromechanical device to the mounting orientation hub, wherein
the mechanical or electromechanical device coupled to the orientation hub is configured to
rotate about at least one of a central vertical axis of the device and a center point of gravity so as to be aligned with at least with one of a vertical surface and another mechanical or an electromechanical device and once aligned secured in a state of alignment by the fastener.

2. The mechanical or an electromechanical device of claim 1, further comprising at least one extender that extends outwardly from the mounting orientation hub is configured to couple to the tensile support.

3. The mechanical or an electromechanical device of claim 1, further comprising a protrusion that is integrally formed with, or removably coupled to, the mounting orientation hub has a mechanical capacity to support a weight of the mechanical or an electromechanical device.

4. The mechanical or an electromechanical device of claim 1, wherein the mounting orientation hub is directly supported from above by a J box.

5. The mechanical or an electromechanical device of claim 1, wherein the mounting orientation hub is directly supported from above by overhead support structure.

6. The mechanical or an electromechanical device of claim 1, wherein tensile support is directly or indirectly coupled to a bore in a surface of the mounting orientation hub.

7. The mechanical or an electromechanical device of claim 1, further comprising a conductor configured to convey power or power and data to the mechanical or electromechanical device through a through opening in the mounting orientation hub.

8. An electromechanical device comprising:
a tensile support including at least of a cable or a chain;
a mounting orientation hub coupled via the tensile support to an overhead support structure, the mounting orientation hub includes
an elongated bore,
at least one protrusion that extends upwardly away from a top surface, or a perimeter, of the mechanical or electromechanical device, the at least one protrusion is extendable through the elongated bore; and
a conductor configured to convey power or power and data therethrough, the conductor being coupled to and/or at least partially disposed within the overhead support structure;
a fastener that locks and secures the electromechanical device to the mounting orientation hub at a predetermined origination, wherein the mechanical or electromechanical device coupled to the orientation hub is configured to rotate about at least one of a central vertical axis of the device and a center point of gravity prior to being fixed in place by the fastener;
a light source with orientation specific optics coupled to at least a bottom surface of the electromechanical device, wherein
rotation of the electromechanical device to the predetermined orientation, and secured in place by the fastener, causes light emitted through the orientation specific optics to be directed to vertical and horizontal surfaces in adjacent regions and illuminate the vertical and horizontal surfaces according to a predetermined light intensity distribution.

9. The electromechanical device of claim 8, further comprising at least one extender that extends outwardly from the mounting orientation hub is configured to couple to the tensile support.

10. The electromechanical device of claim 8, further comprising a protrusion that is integrally formed with, or removably coupled to, the mounting orientation hub has a mechanical capacity to support a weight of the mechanical or an electromechanical device.

11. The electromechanical device of claim 8, wherein power or power and data is conveyed to the electromechanical device via the conductor through a through opening in the mounting orientation hub.

12. The electromechanical device of claim 8, wherein the tensile support returns the electromagnetic device to the predetermined orientation in response to the electromechanical device having been contacted by a moving object.

13. The electromechanical device of claim 8, wherein at least one tab with a through bore extends upwardly from the hub.

14. The electromechanical device of claim 8, wherein the mounting orientation hub is detachably attachable to a J box and a mechanical or electromechanical device.

15. An electromechanical device comprising:
- a J-box;
- a tensile support including at least of a cable or a chain that connects directly or indirectly to the J-box that is positioned above;
- a power or power and data conductor is a horizontally or substantially horizontally disposed and is coupled to a power or power and data distribution hub located inside or adjacent to the J box;
- a conductor coupled to the power/data distribution hub at one end and extend downwardly through an opening in an orientation hub opening and coupled at the other end to an electromechanical device;
- the mounting orientation hub includes
  - an elongated bore sized to receive a through protrusion or a through bolt from below or above that couple the electromechanical device, wherein the protrusion locks and secures the electromechanical device to the mounting orientation hub at a predetermined origination, wherein the mechanical or electromechanical device coupled to the orientation hub is configured to rotate about at least one of a central vertical axis of the device and a center point of gravity prior to being fixed in place by the protrusion; and
- a light source with orientation specific optics coupled to at least a bottom surface of the electromechanical device, wherein
- rotation of the electromechanical device to the predetermined orientation, and secured in place by the protrusion, causes light emitted through the orientation specific optics to be directed to vertical and horizontal surfaces in adjacent regions and illuminate the vertical and horizontal surfaces according to a predetermined light intensity distribution.

16. The electromechanical device of claim 15, wherein the power or power and data conductor at one end couples a different distribution hub inside the J box and on the other end couples to the electromechanical device.

17. The electromechanical device of claim 15, wherein power or power and data entering the J box is distributed to the electromechanical device below and at least one distal power consuming device.

18. The electromechanical device of claim 15, wherein the power and data conductor couple to the electromechanical device through a through opening in a mounting orientation hub.

19. The electromechanical device of claim 18, wherein the power and data conductor couples to power source through an opening in a J box cover.

20. The electromechanical device of claim 15, wherein the mounting orientation hub can be coupled to a J box and a mechanical or electromechanical device.

* * * * *